(No Model.)
J. CARNRICK.
PROCESS OF PREPARING POWDERED MILK.
No. 357,465. Patented Feb. 8, 1887.
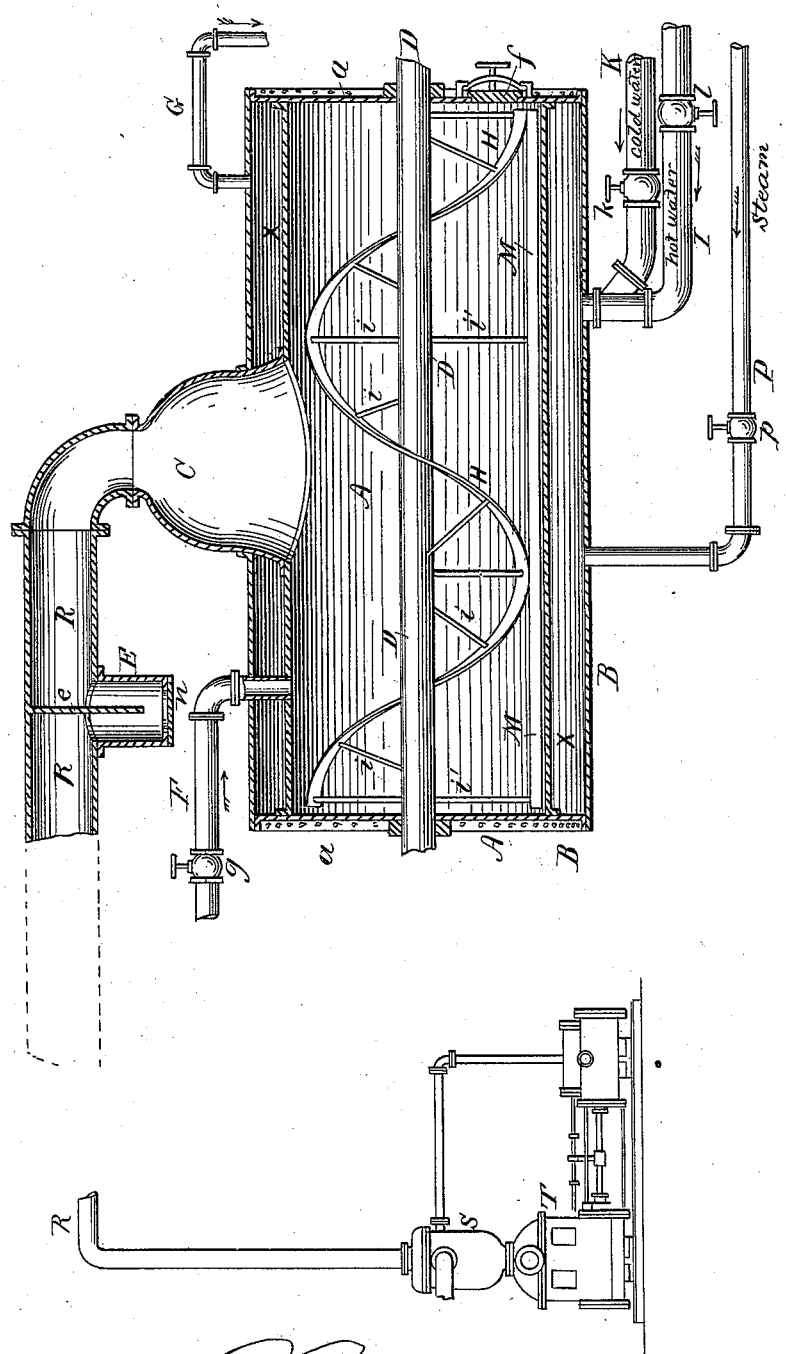

UNITED STATES PATENT OFFICE.

JOHN CARNRICK, OF NEW YORK, N. Y.

PROCESS OF PREPARING POWDERED MILK.

SPECIFICATION forming part of Letters Patent No. 357,465, dated February 8, 1887.

Application filed September 3, 1886. Serial No. 212,589. (No specimens.)

*To all whom it may concern:*

Be it known that I, JOHN CARNRICK, a citizen of the United States, residing at New York, in the county of New York and State of New York, have invented certain new and useful Improvements in Processes of Preparing Powdered Milk; and I do hereby declare the following to be a full, clear, and exact description of the invention, such as will enable others skilled in the art to which it appertains to make and use the same.

This invention relates to a process of producing powdered saccharated milk by evaporation, agitation, and granulation at a low temperature in a vacuum evaporating apparatus.

Attempts heretofore made to produce powdered or granulated milk have not resulted in commercial success, and have not advanced beyond the experimental stage. Powdered milk is therefore not known in the trade.

I have succeeded by my process in producing a cream-white dry powdered or granulated milk free from stickiness or lumps, of a pleasant sweet milky flavor, and possessing good keeping qualities. My powdered milk possesses all the constituents and properties of fresh sweet milk, and is therefore admirably adapted for all dietetic and domestic purposes where fresh milk is now generally used. It is superior to fresh milk in the fact that it keeps perfectly without deterioration, and is as convenient and agreeable to use as sugar.

In conducting my process fresh cow's milk is first treated for the removal of one-fourth or other small fractional part—such as one-eighth or one-sixteenth—of its cream. It is then placed in a vacuum evaporating pan or cylinder preferably provided with a surrounding water-jacket, and therein subjected to a low even temperature of 140° Fahrenheit to 160° Fahrenheit during the early stages of the operation and to agitation without boiling. The milk is thus reduced to the condition of ordinary condensed milk or to a thick sirupy consistency. At this stage of the operation, while the agitation is continued, I add in a continuous stream or periodically granulated white sugar in suitable proportion to make the mass friable and prevent balling or lumping. Toward the last part of the operation, as the mass approaches the condition of powder, the temperature is reduced to a degree between 120° and 130° Fahrenheit to prevent coloration or formation of caramel.

Having stated the nature of my invention, I will now describe suitable vacuum evaporating apparatus for carrying out my process by reference to the accompanying drawing, in which the figure represents a vertical longitudinal section of the evaporating-cylinder with the condenser and exhaust-pump in elevation.

The cylindrical evaporating-chamber A may be made of copper or other suitable metal, and has riveted to its ends the heads $a$, which are of larger diameter and project circumferentially a sufficient distance to connect with the larger outer cylinder or jacket, B, to which they are riveted by an outwardly-turned flange. The jacket B is enough larger than cylinder A to form between them a circumferential water-space, X, of several inches, more or less, depending upon the size of the apparatus. The dome C is arranged centrally at the top of the evaporator, and is riveted to the inner and outer cylinders and connects with the exhaust-pipe R, leading to the usual condenser, S, and pump T. Pipe R is provided with the usual overflow-chamber, E, and depending stop-plate $e$, and chamber E has at the bottom a removable closing plate or door, $n$. The head $a$ is provided with an opening near the bottom of cylinder A, closed by a door, $f$, having means for tightly securing it to its seat. This opening serves for the removal of the dried contents of the evaporator. An opening and door may be provided in each head of the cylinder. An opening and door (not shown) should be provided for feeding in the granulated sugar at the proper stage of the operation, elsewhere described. A hot-water-supply pipe, I, having valve $l$, connects with the under side of jacket B, and a cold-water-supply pipe, K, having valve $k$, connects by a bent portion inclined toward the jacket with pipe I. A steam-supply pipe, P, having valve $p$, also connects with the jacket. Overflow-pipe G connects with the upper side of the jacket for the escape of water to keep up the circulation in the jacket. A milk-supply pipe, F, having valve $g$, projects through the jacket and connects with cylinder A.

The shaft D of the agitator passes centrally through the heads a in suitable stuffing-boxes, and extends longitudinally through cylinder A. It is provided with radial arms or spokes i, arranged spirally from end to end, and such spokes stop, preferably, several inches short of the inner surface of cylinder A, and have secured to their outer ends the spirally-twisted blade H, which may be either wider or narrower than represented in the figure of the drawing. One or more agitator-blades may be secured to the spokes i, inside of blade H and nearer to shaft D, and one or more blades may be spirally twisted around the shaft in the opposite direction to the blade D, (shown,) so as to form a double spiral agitator operating to carry changing portions of the liquid or material under treatment in opposite directions at the same time. It is apparent that with a single spiral blade changing portions of the liquid or other condensed material will be positively forced toward one end of the cylinder, and then back by counter or return currents. In addition to the spiral blade or blades, I provide one or more straight, or, if desirable, slightly curved, scraper-blades, M, secured to the outer ends of spokes i', so as to almost touch the inner surface of cylinder A from end to end, and operate to keep its entire surface clear of adhering particles, which are liable to accumulate without such scraper. The shaft D is to be provided at one or both ends with a cog or belt wheel, and connected with suitable operating-gear.

Important advantages are gained by entirely surrounding the evaporating and drying cylinder with a water-heating jacket, as the liquid or other material is thus subjected to a uniform low temperature on all sides, which will act efficiently and rapidly, but not injuriously.

In operation hot water is admitted in regulated quantity to the annular space X by pipe I, and in order to heat or maintain the water at a higher temperature, steam may be admitted to the jacket by pipe P. Should the temperature in the cylinder rise too high, cold water is admitted to the jacket in regulated quantity by pipe K. It is evident that both hot and cold water may be simultaneously admitted in graduated quantities or proportions to the jacket by pipes I and K, and the excess be gradually conducted off at the top by overflow-pipe G, which will be provided with a controlling-valve. Since the water is admitted under pressure at the bottom and is taken off at the top, the space X between the cylinders is kept full and imparts heat to the entire surface of cylinder A. When it is desired to cool the contents of cylinder A, the steam and hot water are shut off, and cold water alone is circulated through the jacket-space.

A suitable quantity of milk to form a charge or batch adapted to the size of evaporator in use is first treated in a manner well known for extracting one-fourth or less, as one-eighth or one-sixteenth, of its cream, and is then admitted by pipe F to the evaporating-cylinder. The cylinder may have been warmed up by the admission of hot water, below the boiling-point, to the jacket, and the exhaust-pump slowly started before the admission of milk to the cylinder. After the milk is well warmed the agitator is slowly started. The exhausting and condensing apparatus is kept in operation till the batch under treatment is completely dried and granulated. The temperature is maintained at a low degree—from 140° to 160° Fahrenheit—and the agitation continued until the charge is brought to a thick sirupy consistency, much like ordinary condensed milk. An important part of my process is now commenced, and is as follows: White cane-sugar, preferably in a fine granular condition, is gradually fed into and thoroughly mixed with the partially-concentrated batch, and soon causes it to lose its viscid characteristics and become friable, and as the heat and agitation are continued to assume the granular condition. The sugar crystals or granules become permeated and coated with the rich thick milk, and before the sugar can dissolve the whole batch quickly assumes the granular form and is readily worked by the spiral agitator. Except for the addition of the granular sugar or its equivalent granular matter at the stage of the process named, the thickened milk would become sticky and lumpy and adhere to agitating arms and blades, or roll round the evaporating-chamber in a large coherent mass, which it is impossible to successfully work and dry out so as to give satisfactory results. As the batch thickens the temperature is gradually lowered, and as it approaches a granular condition the temperature is maintained at from 120° to 130° Fahrenheit. This precaution is desirable in order to prevent coloration or destruction of the fine milk flavor, which is a characteristic of the powdered milk made by my process. Sugar is used in the proportion of thirty to fifty per cent., by weight, of the batch of milk treated, and is sufficient to secure the advantageous granulation above described, and to preserve the milk for an indefinite time. The evaporation is continued till the batch is brought to a dry granular condition, when it may be readily removed from the cylinder or pan. When taken from the pan it is of nearly uniform grain and constitutes a marketable article of powdered milk. It can be used directly for many purposes without further treatment; but, in order to complete the process and give the milk a more pleasant appearance, the granular powder is ground very fine in a revolving burr-stone mill or other suitable mill. The ground powder may be separated into grades of different fineness by running it through fine-mesh sieves or bolting-cloths similar to flour-bolts. The finer grades of powdered milk made by my process are in the form of a light soft smooth powder, resembling in touch and appearance the finest confectioners' powdered sugar or wheat-flour.

It has a rich moderately-sweet taste resembling the flavor of fresh sweet milk, though somewhat sweeter than ordinary milk.

My powdered milk has been subjected to severe tests to ascertain its keeping qualities. For instance, it has been exposed to moist air at a temperature of 115° to 120° Fahrenheit, and has been exposed for months in the open air under varying degrees of temperature without affecting its fine flavor and appearance.

Instead of white granulated sugar to cause the condensed milk to granulate, the dry granulated milk previously produced may be used with good results. Malt-sugar, grape-sugar, and milk-sugar, all in a dry granulated condition, may be substituted for cane-sugar. Mixtures of the above-mentioned sugars with each other and with cane-sugar may also be used in the same manner above described with reference to cane-sugar for causing granulation of the condensed milk.

I do not limit myself to the removal of a portion of the cream from the milk in carrying out my process of producing powered milk, as good results may be obtained without such removal.

I do not claim the apparatus herein described and illustrated; but it represents one form of evaporator which may be advantageously used in conducting my process.

Having described my invention, what I claim, and desire to secure by Letters Patent, is—

1. The process of manufacturing granular or powdered milk, which consists in evaporating the fresh milk at a low temperature *in vacuo* to a sirupy consistence, and then, while subjected to continued agitation, adding a granular substance, as one or more of the different kinds of sugar, and continuing the evaporation and agitation till the batch is brought to a condition of dry granular powder.

2. The process of manufacturing granular or powdered milk, which consists in first removing a portion of the cream of sweet milk, then evaporating it at a temperature at or above 140° Fahrenheit, but without boiling, subjecting the partially-condensed charge to agitation, and adding sugar in granular form, and continuing the evaporation till the charge is brought to a dry granular powder.

3. The process of producing dry powdered milk, which consists in evaporating sweet milk *in vacuo* at a low temperature with agitation, adding to the partially-condensed charge a granular sugar, and continuing the evaporation till the batch is brought to a dry granular condition and then grinding it to a fine powder.

In testimony whereof I affix my signature in presence of two witnesses.

JOHN CARNRICK.

Witnesses:
JOHN C. LANG,
AUGUSTUS SAZMAN.